(12) United States Patent
Seok

(10) Patent No.: US 10,355,755 B2
(45) Date of Patent: *Jul. 16, 2019

(54) METHOD AND DEVICE FOR TRANSMITTING DATA UNIT

(71) Applicant: TECHFLUX, LTD., Seojong-si (KR)

(72) Inventor: Yong Ho Seok, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/626,042

(22) Filed: Jun. 16, 2017

(65) Prior Publication Data

US 2017/0288745 A1 Oct. 5, 2017

Related U.S. Application Data

(63) Continuation of application No. 15/334,614, filed on Oct. 26, 2016, now Pat. No. 9,685,999, which is a continuation of application No. PCT/IB2015/001239, filed on Jun. 26, 2015.

(30) Foreign Application Priority Data

Jun. 27, 2014 (KR) ........................ 10-2014-0080168

(51) Int. Cl.
| | |
|---|---|
| *H04L 27/26* | (2006.01) |
| *H04B 7/0413* | (2017.01) |
| *H04W 84/12* | (2009.01) |
| *H04W 88/08* | (2009.01) |

(52) U.S. Cl.
CPC ....... *H04B 7/0413* (2013.01); *H04L 27/2602* (2013.01); *H04L 27/265* (2013.01); *H04W 84/12* (2013.01); *H04W 88/08* (2013.01)

(58) Field of Classification Search
None
See application file for complete search history.

(56) References Cited

U.S. PATENT DOCUMENTS

| | | |
|---|---|---|
| 7,474,608 B2 | 1/2009 | Stephens et al. |
| 7,873,022 B2 | 1/2011 | Hansen et al. |
| 8,155,613 B2 | 4/2012 | Kent et al. |
| 8,554,203 B2 | 10/2013 | Shamain et al. |
| 8,717,865 B2 | 5/2014 | Yang et al. |
| 8,718,191 B2 | 5/2014 | Lee et al. |
| 8,761,273 B2 | 6/2014 | Son et al. |
| 8,774,124 B2 | 7/2014 | Porat et al. |
| 8,873,651 B2 | 10/2014 | Muhammad et al. |
| 8,917,784 B2 | 12/2014 | Muhammad et al. |
| 8,917,785 B2 | 12/2014 | Van Nee et al. |
| 8,934,572 B2 | 1/2015 | Zheng et al. |
| 8,942,311 B2 | 1/2015 | Zhang et al. |
| 9,001,637 B2 | 4/2015 | Lee, II |

(Continued)

FOREIGN PATENT DOCUMENTS

| | | |
|---|---|---|
| CN | 103701733 A | 4/2014 |
| CN | 104717725 A | 6/2015 |

(Continued)

*Primary Examiner* — Mohammad S Adhami

(57) ABSTRACT

A method for transmitting a data unit and a device suing the same is provided. The device generates a physical layer protocol data unit (PPDU) that includes a first part and a second part. The first and second part are generated with different fast Fourier transform (FFT) size. A phase rotation of the second part is different from a phase rotation of the first part.

14 Claims, 9 Drawing Sheets

(56) References Cited

U.S. PATENT DOCUMENTS

| | | |
|---|---|---|
| 9,001,930 B2 | 4/2015 | Suh et al. |
| 9,008,167 B2 | 4/2015 | Azizi et al. |
| 9,119,186 B2 | 8/2015 | Zhang et al. |
| 9,191,257 B2 | 11/2015 | Tu et al. |
| 9,197,473 B2 | 11/2015 | Porat et al. |
| 9,210,024 B2 | 12/2015 | Azizi et al. |
| 9,258,163 B2 | 2/2016 | Yang et al. |
| 9,270,429 B2 | 2/2016 | Stephens et al. |
| 9,271,241 B2 | 2/2016 | Kenney et al. |
| 9,325,463 B2 | 4/2016 | Azizi et al. |
| 9,326,262 B2 | 4/2016 | Li et al. |
| 9,350,590 B2 | 4/2016 | Ganesan et al. |
| 9,363,122 B2 | 6/2016 | Park et al. |
| 9,374,736 B2 | 6/2016 | Cheong et al. |
| 8,923,261 B2 | 12/2016 | Lee et al. |
| 9,685,999 B2 * | 6/2017 | Seok .................. H04L 27/2602 |
| 2011/0110348 A1 | 5/2011 | Lee et al. |
| 2012/0314636 A1 | 12/2012 | Liu |
| 2012/0314786 A1 | 12/2012 | Atungsiri et al. |
| 2014/0307699 A1 | 10/2014 | Sorrentino |
| 2015/0009894 A1 | 1/2015 | Vermani et al. |
| 2015/0023272 A1 | 1/2015 | Choi et al. |
| 2015/0023449 A1 | 1/2015 | Porat et al. |
| 2015/0063255 A1 | 3/2015 | Tandra et al. |
| 2015/0071372 A1 | 3/2015 | Zhang |
| 2015/0117428 A1 | 4/2015 | Lee et al. |
| 2015/0139089 A1 | 5/2015 | Azizi |
| 2015/0139205 A1 | 5/2015 | Kenney |
| 2016/0037441 A1 | 2/2016 | Li et al. |
| 2016/0050093 A1 | 2/2016 | Choi et al. |
| 2016/0112899 A1 | 5/2016 | Kenney et al. |

FOREIGN PATENT DOCUMENTS

| | | |
|---|---|---|
| EP | 02556636 A1 | 2/2013 |
| EP | 02858292 A1 | 4/2015 |
| EP | 03018852 A1 | 5/2016 |
| JP | 2013225777 A2 | 9/2015 |
| WO | WO-2011099765 A2 | 8/2011 |
| WO | WO-2013074917 A1 | 5/2013 |
| WO | WO-2015077056 A1 | 5/2015 |
| WO | WO-2015102181 A1 | 7/2015 |

* cited by examiner

Non-HT PPDU format (IEEE 802.11a/g)

HT PPDU format (IEEE 802.11n)

VHT PPDU format (IEEE 802.11ac)

FIG. 2

Non-HT PPDU

<1st OFDM symbol><2nd OFDM symbol>

HT PPDU

<1st OFDM symbol><2nd OFDM symbol>

VHT PPDU

<1st OFDM symbol>    <2nd OFDM symbol>

| L-STF | L-LTF | L-SIG | HEW-SIGA | HEW-STF(-1) | HEW-LTF(-1) | HEW-LTF(-1) | ... | HEW-SIGB(-1) |
| | | | | HEW-STF(-1) | HEW-LTF(-1) | HEW-LTF(-1) | ... | HEW-SIGB(-1) |
| | | | | HEW-STF(-1) | HEW-LTF(-1) | HEW-LTF(-1) | ... | HEW-SIGB(-1) |
| | | | | HEW-STF(+1) | HEW-LTF(+1) | HEW-LTF(+1) | ... | HEW-SIGB(+1) |

METHOD AND DEVICE FOR TRANSMITTING DATA UNIT

CROSS-REFERENCE TO RELATED APPLICATIONS

The present application is a continuation application of a currently pending U.S. application Ser. No. 15/334,614 having a U.S. filing date of Oct. 26, 2016. The U.S. application Ser. No. 15/334,614 is a bypass continuation application of an international application No. PCT/IB2015/001239 having an international filing date of 26 Jun. 2015 and designating the United States, the international application claiming priority to an earlier filed Korean patent application 10-2014-0080168 having a filing date of 27 Jun. 2014. The entire contents of all of the aforesaid applications including the U.S. patent application, the international application, and the aforesaid Korean patent application are incorporated herein by reference. The applicant claims the benefit of and claims priory herein to all of these applications and their filing dates and priority dates.

BACKGROUND OF THE INVENTION

Field of the Invention

The present invention relates to wireless communications, and more particularly, to a method for transmitting a data unit for a wireless communication and a device using the same.

Related Art

Institute of Electrical and Electronics Engineers (IEEE) 802.11n standard established in 2009 provides a transfer rate of up to 600 Mbps at a frequency band of 2.4 GHz or 5 GHz on the basis of Multiple Input Multiple Output (MIMO) technique.

IEEE 802.11ac standard established in 2013 aims to provide a throughput greater than or equal to 1 Gbps utilizing Medium Access Control (MAC) Service Access Point (SAP) layer scheme at a frequency band less than or equal to 6 GHz. A system supporting IEEE 802.11ac standard is referred to as a Very High Throughput (VHT) system.

There are continuing efforts to implement more effective Wireless Local Area Network (WLAN) technologies in increasingly congested environments.

SUMMARY OF THE INVENTION

The present invention provides a method for transmitting a data unit in a wireless local area network.

The present invention also provides a device for transmitting a data unit in a wireless local area network.

In an aspect, a method for transmitting a data unit in a wireless local area network is provided. The method includes generating a physical layer protocol data unit (PPDU), the PPDU including a first part and a second part, and transmitting the PPDU to a receiver over a transmission bandwidth. The first part is generated with a first fast Fourier transform (FFT) size. The second part is generated with a second FFT size. The first FFT size is different from the second FFT size. A phase rotation of the second part is different from a phase rotation of the first part.

Subcarriers for the second part may be divided into a plurality of subgroups, respective subgroup being phase-rotated by multiplying +1 or −1.

Subcarriers for the first part may be divided into a plurality of subgroups, respective subgroup being phase-rotated by multiplying +1, −1 or +j.

A number of subcarriers in respective subgroup of the second part may be different from a number of subcarriers in respective subgroup of the first part.

The first part may include a legacy-short training field (L-STF), a legacy-long training field (L-LTF) and a legacy-signal (L-SIG).

Two orthogonal frequency division multiplexing (OFDM) symbols next to the L-SIG may use binary phase shift keying (BPSK) modulations.

In another aspect, a device configured for transmitting a data unit in a wireless local area network is provided. The device includes a radio frequency module configured to transmit and receive radio signals, and a processor operatively coupled with the radio frequency module. The processor is configured to generate a physical layer protocol data unit (PPDU), the PPDU including a first part and a second part, and instruct the radio frequency module to transmit the PPDU to a receiver over a transmission bandwidth. The first part is generated with a first fast Fourier transform (FFT) size. The second part is generated with a second FFT size. The first FFT size is different from the second FFT size. A phase rotation of the second part is different from a phase rotation of the first part.

Since a greater amount of data can be transmitted during a same time period, a transmission efficiency can be increased. In addition, a Peak-to-Average Power Ratio (PAPR) of a transmitter can be decreased.

BRIEF DESCRIPTION OF THE DRAWINGS

FIG. 2 shows an HEW PPDU format according to an embodiment of the present invention.

FIG. 5 shows an HEW PPDU format in a 20 MHz channel.

FIG. 6 shows an HEW PPDU format in a 40 MHz channel.

FIG. 7 shows an HEW PPDU format in an 80 MHz channel.

DESCRIPTION OF EXEMPLARY EMBODIMENTS

The proposed wireless local area network (WLAN) system may operate at a band less than or equal to 6 GHz or at a band of 60 GHz. The operating band less than or equal to 6 GHz may include at least one of 2.4 GHz and 5 GHz.

For clarity, a system complying with the Institute of Electrical and Electronics Engineers (IEEE) 802.11 a/g standard is referred to as a non-High Throughput (non-HT) system, a system complying with the IEEE 802.11n standard is referred to as a High Throughput (HT) system, and a system complying with IEEE 802.11ac standard is referred to as a Very High Throughput (VHT) system. In comparison thereto, a WLAN system complying with the proposed method is referred to as a High Efficiency WLAN (HEW)

system. A WLAN system supporting systems used before the HEW system is released is referred to as a legacy system. The HEW system may include an HEW Station (STA) and an HEW Access Point (AP). The term HEW is only for the purpose of distinguishing from the conventional WLAN, and there is no restriction thereon. The HEW system may support IEEE 802.11a/g/n/ac by providing backward compatibility in addition to the proposed method.

Hereinafter, unless a function of a station (STA) is additionally distinguished from a function of an Access Point (AP), the STA may be a non-AP STA and/or the AP. When it is described as an STA-to-AP communication, the STA may be expressed as the non-AP STA, and may correspond to communication between the non-AP STA and the AP. When it is described as STA-to-STA communication or when a function of the AP is not additionally required, the STA may be the non-AP STA or the AP.

A Physical layer Protocol Data unit (PPDU) is a data unit for data transmission.

Figure 1:
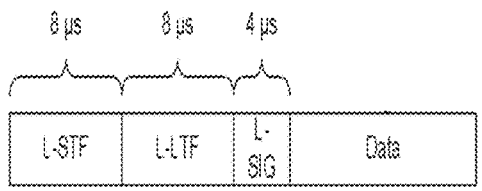
FIG. 1 shows PPDU formats used by the legacy system.
Figure 1:
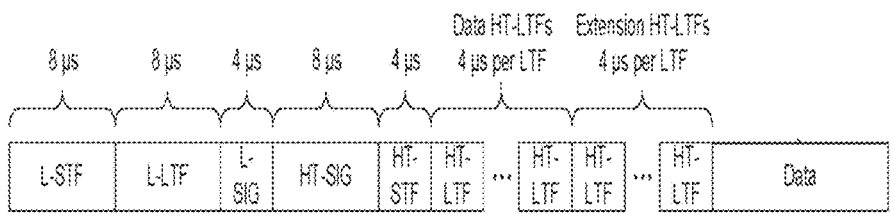
Figure 1:
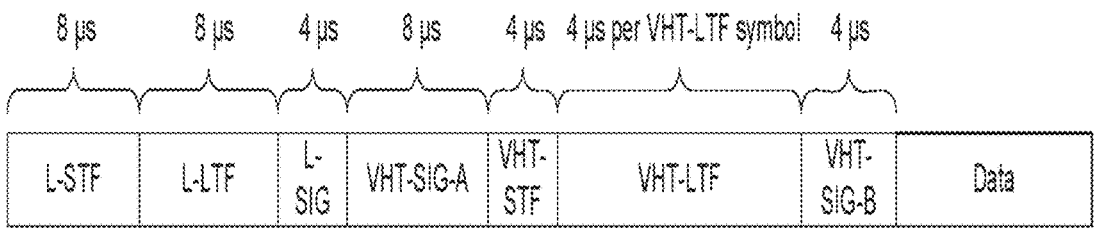

FIG. 1 shows PPDU formats used by the legacy system.

A non-HT PPDU supporting IEEE 802.11a/g includes a Legacy-Short Training Field (L-STF), a Legacy-Long Training Field (L-LTF), and a Legacy-Signal (L-SIG).

An HT PPDU supporting IEEE 802.11n includes a HT-SIG, a HT-STF, and a
HT-LTF after the L-SIG.

A VHT PPDU supporting IEEE 802.11ac includes a VHT-SIG-A, a VHT-STF, a VHT-LTF, and a VHT-SIG-B after the L-SIG.

Figure 2:
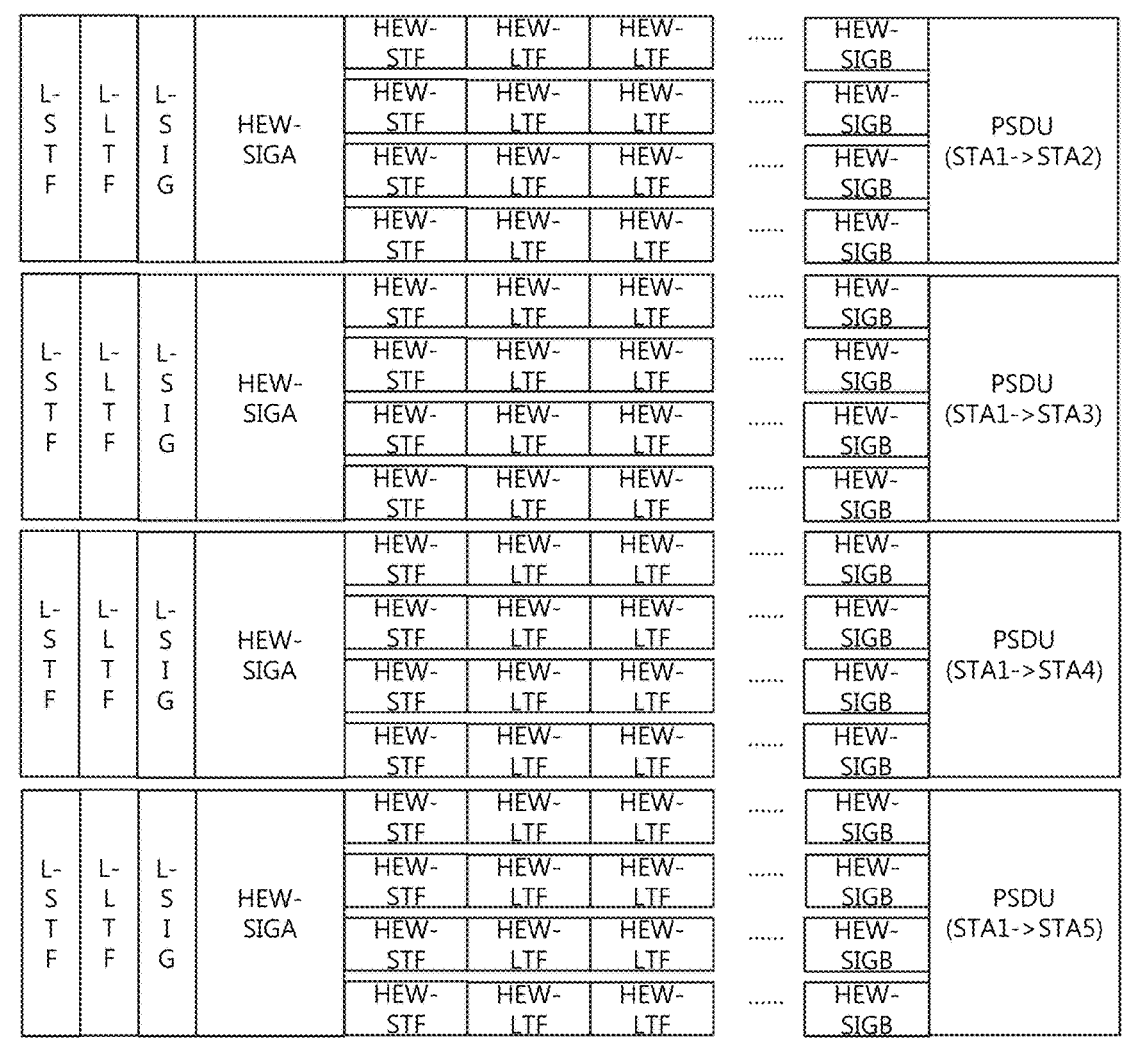

FIG. 2 shows an HEW PPDU format according to an embodiment of the present invention.

An L-STF may be used for frame detection, Automatic Gain Control (AGC), diversity detection, and coarse frequency/time synchronization.

An L-LTF may be used for fine frequency/time synchronization and channel estimation.

An L-SIG may include information indicating a total length of a corresponding PPDU (or information indicating a transmission time of a physical layer protocol service unit (PSDU)).

The L-STF, the L-LTF and the L-SIG may be identical to L-STF, L-LTF and L-SIG of the VHT system. The L-STF, the L-LTF and the L-SIG may be referred to as a legacy portion. The L-STF, the L-LTF, and the L-SIG may be transmitted in at least one Orthogonal Frequency Division Multiplexing (OFDM) symbol generated on the basis of 64-points Fast Fourier Transform (FFT) (or 64 subcarriers) in each 20 MHz channel. For 20 MHz transmission, the legacy portion may be generated by performing an inverse Discrete Fourier Transform (IDFT) with 64 FFT points. For 40 MHz transmission, the legacy portion may be generated by performing an IDFT with 128 FFT points. For 80 MHz transmission, the legacy portion may be generated by performing an IDFT with 512 FFT points.

A HEW-SIGA may include common control information commonly received by an STA which receives a PPDU. The HEW-SIGA may be transmitted in 2 OFDM symbols or 3 OFDM symbols.

The following table exemplifies information included in the HEW-SIGA. A field name or the number of bits is for exemplary purposes only.

TABLE 1

| Field | Bits | Description |
|---|---|---|
| Bandwidth | 2 | Set to 0 for 20 MHz, 1 for 40 MHz, 2 for 80 MHz, 3 for 160 MHz and 80 + 80 MHz mode |
| STBC | 1 | Set to 1 if all streams use STBC, otherwise set to 0. When STBC bit is 1, an odd number of space time streams per user is not allowed. |
| Group ID | 6 | Set to the value of the TXVECTOR parameter GROUP_ID. A value of 0 or 63 indicates a HEW SU PPDU; otherwise, indicates a HEW MU PPDU. |
| Nsts/Partial AID | 12 | For MU: 3 bits/user with maximum of 4 users<br>Set to 0 for 0 space time streams<br>Set to 1 for 1 space time stream<br>Set to 2 for 2 space time streams<br>Set to 3 for 3 space time streams<br>Set to 4 for 4 space time streams<br>Otherwise: first 3 bits contain stream allocation for SU, set to 0 for 1 space time stream, set to 1 for 2 space time streams, etcetera up to 8 streams. Remaining 9 bits contain partial association identifier (AID). |
| No TXOP PS | 1 | Set to 1 to indicate that TXOP PS is not allowed. Set to 0 to indicate that TXOP PS is allowed. Set to the same value in all PPDUs in downlink MU TXOP. |
| GI (Guard interval) | 2 | Set B0 to 0 for Long GI, set to 1 for Short GI. Set B1 to 1 when Short GI. |
| Coding | 2 | For SU:<br>Set B2 to 0 for BCC, set to 1 for LDPC<br>For MU:<br>Set B2 to 0 for BCC, set to 1 for LDPC for 1st user<br>If user 1 has 0 Nsts value, then B2 is reserved and set to 1 |
| MCS | 4 | For SU/Broadcast/Multicast: Modulation and coding scheme (MCS) index<br>For MU:<br>B1: Set to 0 for BCC, 1 for LDPC for the 2nd user<br>B2: Set to 0 for BCC, 1 for LDPC for the 3rd user<br>B3: Set to 0 for BCC, 1 for LDPC for the 4th user<br>If user 2, 3, or 4 has 0 Nsts value, then corresponding bit is reserved and set to 1 |

TABLE 1-continued

| Field | Bits | Description |
|---|---|---|
| SU-Beamformed | 1 | Set to 1 when packet is a SU-beamformed packet<br>Set to 0 otherwise<br>For MU: Reserved, set to 1 |
| CRC | 8 | |
| Tail | 6 | All zeros |

A HEW-STF may be used to improve an AGC estimation in an MIMO transmission.

A HEW-LTF may be used to estimate a MIMO channel. The HEW-LTF may start at the same point of time and may end at the same point of time across all users.

A HEW-SIGB may include user-specific information required for each STA to receive its PSDU. For example, the HEW-SIGB may include information regarding a length of a corresponding PSDU and/or a bandwidth or channel in which the PSDU for a corresponding receiver is transmitted.

A data portion may include at least one PSDU. The position of the HEW-SIGB is illustration purpose only. The HEW-SIGB may be followed by the data portion. The HEW-SIGB may be followed by the HEW-STF or the HEW-LTF.

In the proposed PPDU format, the number of OFDM subcarriers may be increased per unit frequency. The number of OFDM subcarriers may increase K-times by increasing FFT size. K may be 2, 4, or 8. This increase may be accomplished via downclocking (e,g, using a larger FFT size with a same sampling rate).

For example, K=4 downclocking is assumed. As for the legacy portion, 64 FFT is used in a 20 MHz channel, 128 FFT is used in a 40 MHz channel, and 256 FFT is used in an 80 MHz channel. As for a HEW portion using the larger FFT size, 256 FFT is used in a 20 MHz channel, 512 FFT is used in a 40 MHz channel, and 1024 FFT is used in an 80 MHz channel. The HEW-SIGA may have same FFT size as the legacy portion. The HEW portion may have larger FFT size than the legacy portion.

The PPDU is generated by performing IDFT with two different FFT sizes. The PPDU may include a first part with a first FFT size and a second part with a second FFT size. The first part may include at least one of the L-STF, the L-LTF, the L-SIG and the HEW-SIGA. The second part may include at least one of the HEW-STF, the HEW-LTF and the data portion. The HEW-SIGB may be included in the first part or in the second part.

When an FFT size is increased, an OFDM subcarrier spacing is decreased and thus the number of OFDM subcarriers per unit frequency is increased, but an OFDM symbol duration is increased. A guard interval (GI) (or also referred to as a Cyclic Prefix (CP) length) of the OFDM symbol time can be decreased when the FFT size is increased.

If the number of OFDM subcarriers per unit frequency is increased, a legacy STA supporting the conventional IEEE 80.2.11a/g/n/ac cannot decode a corresponding PPDU. In order for the legacy STA and an HEW STA to co-exist, L-STF, L-LTF, and L-SIG are transmitted through 64 FFT in a 20 MHz channel so that the legacy STA can receive the L-STF, the L-LTF, and the L-SIG. For example, the L-SIG is transmitted in a single OFDM symbol, a symbol time of the single OFDM symbol is 4 micro seconds (us), and the GI is 0.8 us.

Although the HEW-SIGA includes information required to decode an HEW PPDU by the HEW STA, the HEW-SIGA may be transmitted through 64 FFT in an 20 MHz channel so that it can be received by both of the legacy STA and the HEW STA. This is to allow the HEW STA to receive not only the HEW PPDU but also the conventional non-HT/HT/VHT PPDU.

Figure 3:
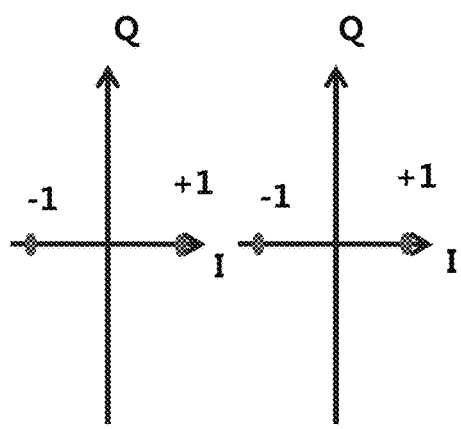
FIG. 3 shows constellation phases for the conventional PPDU.
Figure 3:
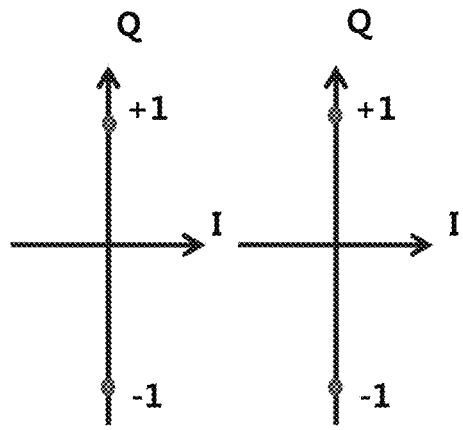
Figure 3:
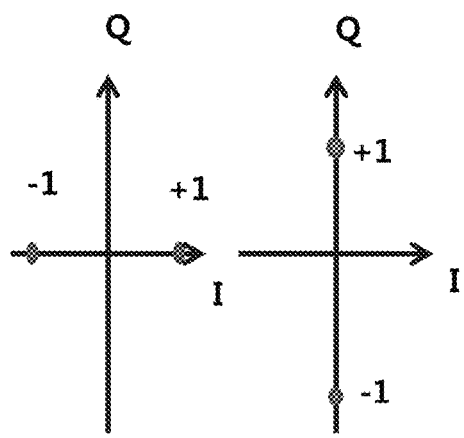

FIG. 3 shows constellation phases for the conventional PPDU.

To identify a format of a PPDU, a phase of a constellation for two OFDM symbols transmitted after L-STF, L-LTF, and L-SIG is used.

A 'first OFDM symbol' is an OFDM symbol first appeared after the L-SIG. A 'second OFDM symbol' is an OFDM symbol subsequent to the first OFDM symbol.

In a non-HT PPDU, the same phase of the constellation is used in the 1st OFDM symbol and the 2nd OFDM symbol. Binary Phase Shift Keying (BPSK) is used in both of the 1st OFMD symbol and the 2nd OFDM symbol.

In an HT PPDU, although the same phase of the constellation is used in the 1st OFDM symbol and the 2nd OFDM symbol, the constellation rotates by 90 degrees in a counterclockwise direction with respect to the phase used in the non-HT PPDU. A modulation scheme having a constellation which rotates by 90 degrees is called Quadrature Binary Phase Shift Keying (QBPSK).

In a VHT PPDU, a constellation of the first OFDM symbol is identical to that of the non-HT PPDU, whereas a constellation of the second OFDM symbol is identical to that of the HT PPDU. The constellation of second OFDM symbol rotates 90 degrees in a counterclockwise direction with respect to the 1st OFDM symbol. The first OFDM symbol uses BPSK modulation, and the 2nd OFDM symbol uses QBPSK modulation. Since VHT-SIG-A is transmitted after L-SIG and the VHT-SIG-A is transmitted in two OFDM symbols, the first OFDM symbol and the second OFDM symbol are used to transmit the VHT-SIG-A.

Figure 4:
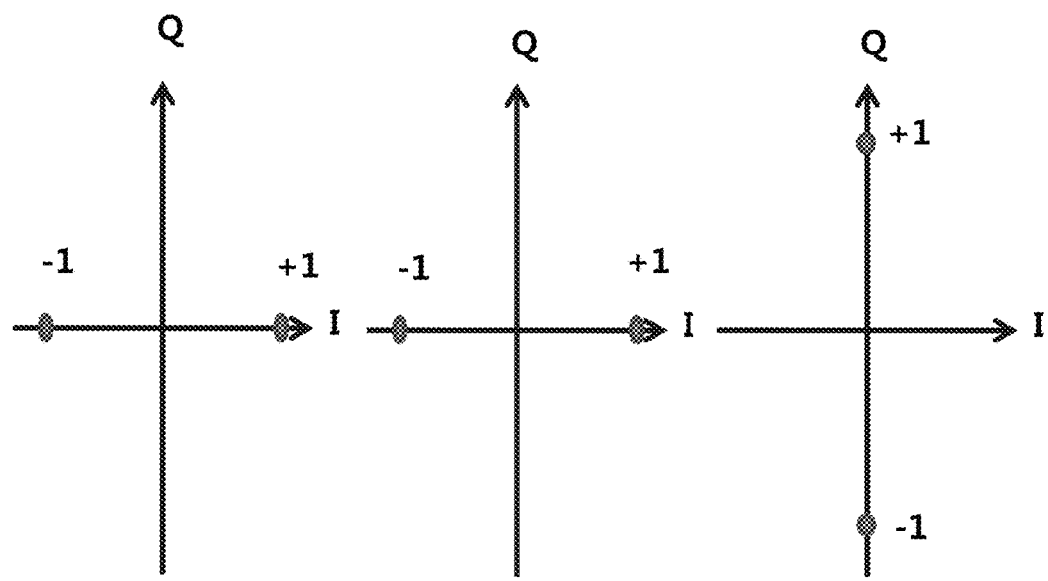
FIG. 4 shows constellation phases for a proposed HEW PPDU.

FIG. 4 shows constellation phases for a proposed HEW PPDU.

To distinguish from a non-HT/HT/VHT PPDU, a constellation of at least one OFDM symbol transmitted after L-SIG can be used.

Just like the non-HT PPDU, a first OFDM symbol and a second OFDM symbol of the HEW PPDU have the same constellation phase. A BPSK modulation may be used for the first OFDM symbol and the second OFDM symbol. The STA can differentiate the HEW PPDU and HT/VHT PPDUs.

In an embodiment, to differentiate the HEW PPDU and the non-HT PPDU, the constellation of a third OFDM symbol can be utilized. The constellation of the third OFDM symbol may rotate by 90 degrees in a counterclockwise direction with respect to the second OFDM symbol. The first and second OFDM symbols may use BPSK modulation, but the third OFDM symbol may use QBPSK modulation.

In another embodiment, the HEW-SIGA may provide an indication about the format of the PPDU. The indication may indicate whether the format of the PPDU is a HEW PPDU. The HEW-SIGA may provide an indication about a use of orthogonal frequency division multiple access (OFDMA).

Hereinafter, a PPDU using a phase rotation in frequency domain is proposed in order to support lower Peak-to-Average Power Ratio (PAPR).

For clarity, it is assumed that the second part (i.e. HEW part) of the PPDU uses 4-times FFT size via downclocking.

Hereinafter, a subchannel refers to a resource allocation unit to be allocated to a STA. Operating bandwidth (i.e. 20 MHz channel, 40 MHz channel, 80 MHz channel or 160 MHz channel) can be divided into a plurality of subchannels. A subchannel may include one or more subcarriers. The plurality of subchannels may have same number of subcarriers or different number of subcarriers. One or more subchannels can be allocated to the STA. The STA can transmit one or more PPDUs through the allocated subchannels to one or more receiving stations. The subchannel may be referred to as 'a subband' or 'a subgroup'.

FIG. 5 shows an HEW PPDU format in a 20 MHz channel.

The first part (i.e. L-LTF, L-LTF, L-SIG and HEW-SIGA) uses 64 FFT in the 20 MHz channel. In order to implement the 256 FFT in the second part, it is proposed to decrease an overhead by performing ¼ down-clocking on a VHT 80 MHz PPDU format and by decreasing GI to 0.8 us and 0.4 us.

If the VHT 80 MHz PPDU format is subjected to ¼ down-clocking, an OFDM symbol time is increased by four times, and thus is 16 us when using Long GI, and is 14.4 us when using Short GI. That is, the GI is also increased to 3.2 us in case of Long GI and to 1.6 us in case of Short GI. However, the GI may keep to 0.8 us in case of Long GI and to 0.4 us in case of Short GI. In doing so, after performing the ¼ downclocking, the OFDM symbol time is 13.6 us when using Long GI and is 13.2 us when using Short GI.

If the VHT 80 MHz PPDU format is subjected to ¼ down-clocking in the 20 MHz channel, each of 64 FFT-based VHT-STF, VHT-LTF, and VHT-SIG-B may constitute one subchannel, and as a result, 4 subchannels are combined and transmitted through the 20 MHz channel in unit of 256 FFT.

In FIG. 5, in order to decrease a Peak-to-Average Power Ratio (PAPR) of a transmitter STA, the second part may be subjected to multiplication for a phase waveform in unit of subchannel as follows.

$$R(k) = \begin{cases} -1, & k \geq -64 \\ +1, & k < -64 \end{cases} \quad \text{[Equation 1]}$$

Herein, R(k) denotes a multiplication value for a phase waveform at a subcarrier index k. When a STA transmits a PPDU through the allocated subchannels, 256 subcarriers are divided into 4 subchannels. Respective subchannel is composed of 64 subcarriers. A sequence {+1, −1, −1, −1} may be multiplied for the 4 subchannels, starting from a subchannel having a smallest subcarrier index, that is, a lowermost subchannel. The number of 4 subchannels and the sequence {+1, −1, −1, −1} are exemplary purpose only. 256 subcarriers may be divided into a plurality of subchannels and respective subchannel may be phase-rotated by multiplying +1 or −1.

The equation 1 can be expressed as follows. The 256 subcarriers are divided into first and second subgroups that have different number of subcarriers. The first subgroup is phase-rotated by multiplying +1 and the second subgroup is phase-rotated by multiplying −1.

A sequence constituting the HEW-STF and the HEW-LTF may be as follows.

HEW-STF={HTS$_{-58,58}$,0,0,0,0,0,0,0,0,0,0,
HTS$_{-58,58}$},

HEW-LTF={LTFleft,1,LTFright,−1,−1,−1,1,1,−1,1,−
1,1,1,−1,LTFleft,1,LTFright,1,−1,1,−1,0,0,0,1,−
1,−1,1,LTFleft,1,LTFright,−1,−1,−1,1,1,−1,1,−1,−1,
1,1,−1,LTFleft,1,LTFright}

Herein:

HTS$_{-58,58}$=
√½{0,1,1+j,0,0,0,−1−j,0,0,0,1+j,0,0,0,−1−j,0,0,0,−
1−j,0,0,0,1+j,0,0,0,0,0,0,0,−1−j,0,0,0,−1−j,0,0,0,
1+j,0,0,0,1+j,0,0,0,1 +j,0,0,0,1+j,0,0,0,0,0,0,0,0,
0,0,0,0,0,0,1+j,0,0,0,−1−j,0,0,0,1 +j,0,0,0,−1−j,
0,0,0,−1−j,0,0,0,1+j,0,0,0,0,0,0,0,−1−j,0,0,0,−1−
j,0,0,0,1+j,0,0,0,1+j,0,0,0,1+j,0,0,0,1+j,0,0},

LTFleft={1,1,−1,−1,1,1,−1,1,−1,1,1,1,1,1,1,−1,−1,1,
1,−1,1,−1,1,1,1,1},

LTFright={1,−1,−1,1,1,−1,1,−1,1,−1,−1,−1,−1,1,1,
1,−1,−1,1,1,−1,1,1,1,1,1}.

Figure 6:
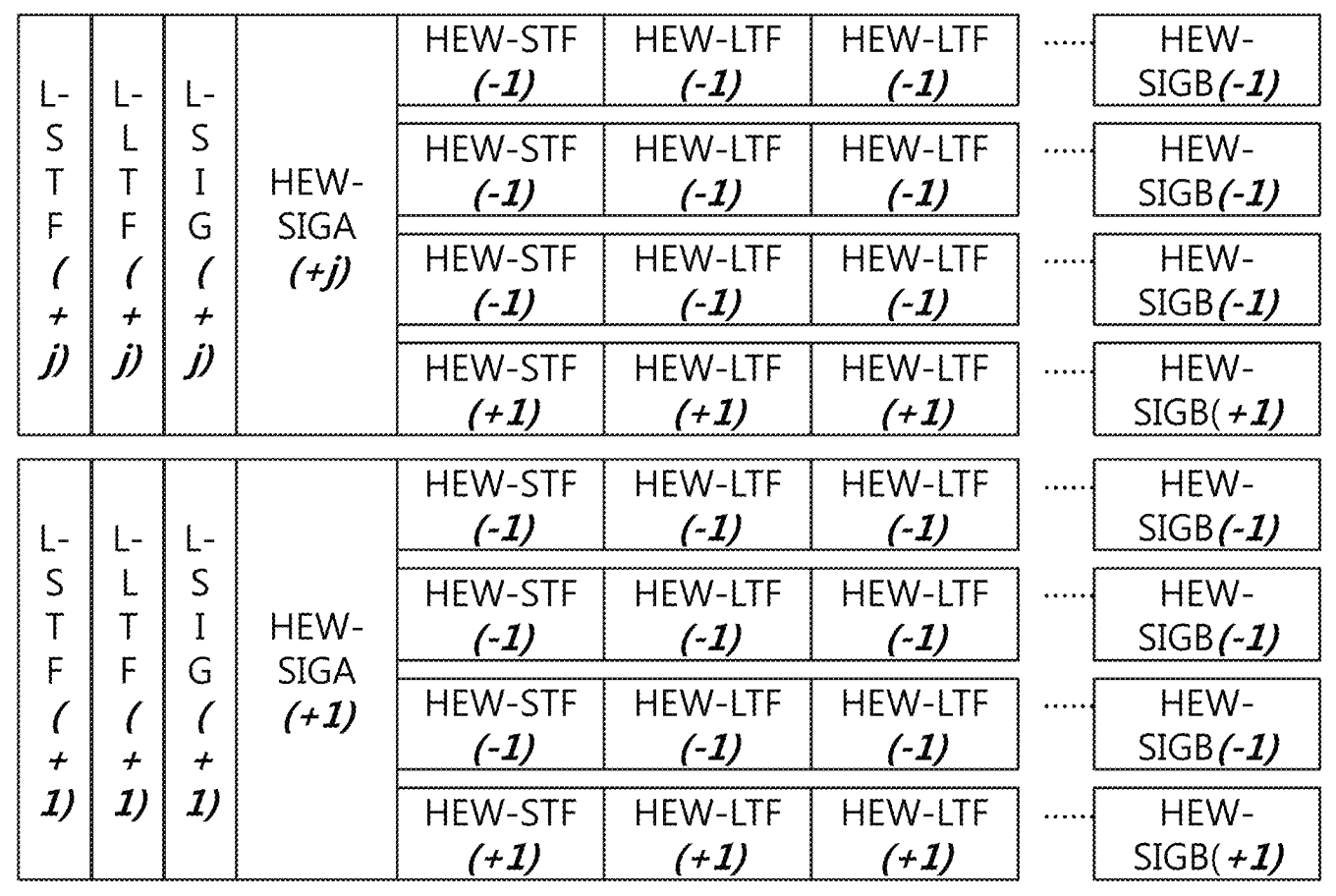

FIG. 6 shows an HEW PPDU format in a 40 MHz channel.

In order to implement the 512 FFT in the 40 MHz channel, it is proposed to use two blocks for the aforementioned 256 FFT transmission of the 20 MHz channel. Like in the 256 FFT transmission in the 20 MHz channel, an OFDM symbol time is 13.6 us when using Long GI, and is 13.2 us when using Short GI.

L-STF, L-LTF, L-SIG, and HEW-SIGA are generated using 64 FFT and are transmitted in a duplicated manner two times in the 40 MHz channel. That is, the first part is transmitted in a first 20 MHz subchannel and its duplication is transmitted in a second 20 MHz subchannel.

In order to decrease a PAPR of a transmitter STA for transmitting the L-STF, the L-LTF, the L-SIG, and the HEW-SIGA, multiplication may be performed on a phase waveform in unit of 20 MHz channel as follows.

$$R(k) = \begin{cases} +j, & k \geq 0 \\ +1, & k < 0 \end{cases} \quad \text{[Equation 2]}$$

This means that the first part is phase-rotated by multiplying +1 for the first 20 MHz subchannel and is phase-rotated by multiplying +j for the second 20 MHz subchannel.

The equation 2 can be expressed as follows. The 128 subcarriers are divided into first and second subgroups. The first subgroup is phase-rotated by multiplying +1 and the second subgroup is phase-rotated by multiplying +j.

For each 64 FFT-based subchannel constituting 512 FFT, in order to decrease a PAPR of a transmitter STA for transmitting HEW-STF, HEW-LTF, and HEW-SIGB, multiplication may be performed on a phase waveform in unit of subchannel as follows.

$$R(k) = \begin{cases} -1, & 64 \leq k \\ +1, & 0 \leq k < 64 \\ -1, & -192 \leq k < 0 \\ +1, & k < -192 \end{cases} \quad \text{[Equation 3]}$$

More specifically, according to Equation 3, 512 subcarriers are divided into 8 subchannels. Respective subchannel is composed of 64 subcarriers. A sequence {+1, −1, −1, −1, +1, −1, −1, −1} may be multiplied for the 8 subchannels, starting from a subchannel having a smallest subcarrier index, that is, a lowermost subchannel.

The equation 3 can be expressed as follows. The 512 subcarriers are divided into four subgroups. The first subgroup is phase-rotated by multiplying +1, the second subgroup is phase-rotated by multiplying −1, the third subgroup is phase-rotated by multiplying +1, and the fourth subgroup is phase-rotated by multiplying −1.

A sequence constituting the HEW-STF and the HEW-LTF may be as follows.

HEW-STF={HTS$_{-58,58}$,0,0,0,0,0,0,0,0,0,0,0,
HTS$_{-58,58}$,0,0,0,0,0,0,0,0,0,0,0,HTS$_{-58,58}$,0,0,0,0,
0,0,0,0,0,0,0,0,HTS$_{-58,58}$},

HEW-LTF={LTFleft,1,LTFright,−1,−1,−1,1,1,−1,1,−
1,1,1,−1,LTFleft,1,LTFright,1,−1,1,−1,0,0,0,1,−
1,−1,1,LTFleft,1,LTFright,−1,−1,−1,1,1,−1,1,−1,
1,1,−1,LTFleft,1,LTFright,0,0,0,0,0,0,0,0,0,0,0,
LTFleft,1,LTFright,−1,−1,−1,1,1,−1,1,−1,1,1,−1,
LTFleft,1,LTFright,1,−1,1,−1,0,0,0,1,−1,−1,1,1,
LTFleft,1,LTFright,−1,−1,−1,1,1,−1,1,−1,1,1,−1,
LTFleft,1,LTFright} where,

HTS$_{-58,58}$=
√½{0,1,1+j,0,0,0,−1−j,0,0,0,1+j,0,0,0,−1−j,0,0,
0,−1−j,0,0,0,1+j,0,0,0,0,0,0,0,−1−j,0,0,0,−1−j,0,
0,0,1+j,0,0,0,1+j,0,0,0,1 +j,0,0,0,1+j,0,0,0,0,0,0,
0,0,0,0,0,0,0,0,0,1+j,0,0,0,−1−j,0,0,0,1 +j,0,0,0,−
1−j,0,0,0,−1−j,0,0,0,1+j,0,0,0,0,0,0,0,−1−j,0,0,
0,−1−j,0,0,0,1 +j,0,0,0,1+j,0,0,0,1+j,0,0,0,1+j,0,
0},

LTFleft={1,1,−1,−1,1,1,−1,1,−1,1,1,1,1,1,1,−1,−1,1,
1,−1,1,−1,1,1,1,1},

LTFright={1,−1,−1,1,1,−1,1,−1,1,−1,−1,1,−1,−1,1,
1,−1,−1,1,−1,1,1,−1,1,1,1,1}.

Figure 7:
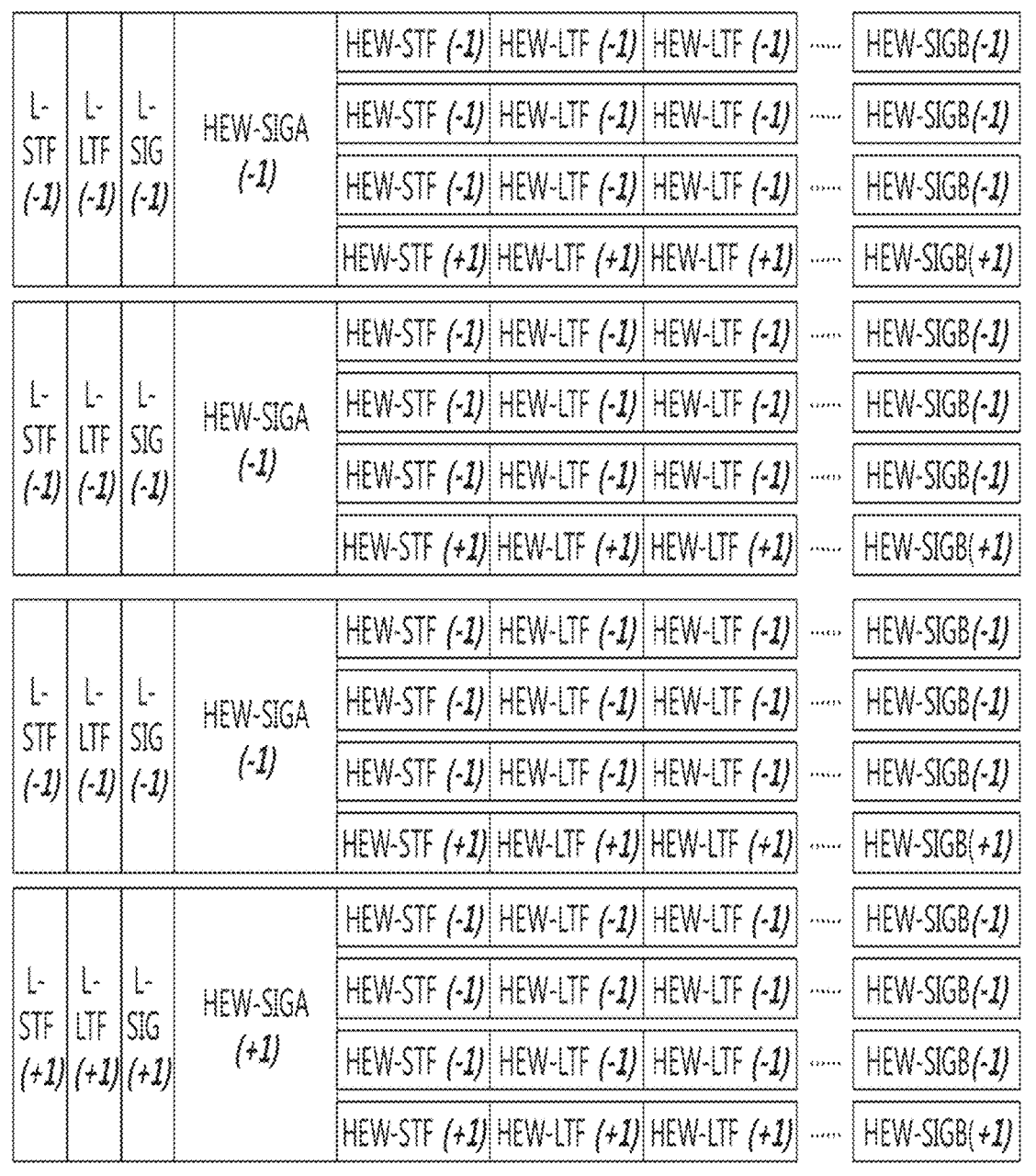

FIG. 7 shows an HEW PPDU format in an 80 MHz channel.

In order to implement the 1024 FFT in the 80 MHz channel, it is proposed to use four blocks for the aforementioned 256 FFT transmission of the 20 MHz channel. Like in the 256 FFT transmission in the 20 MHz channel, an OFDM symbol time is 13.6 us when using Long GI, and is 13.2 us when using Short GI.

L-STF, L-LTF, L-SIG, and HEW-SIGA which are transmitted using 64 FFT are also transmitted in a duplicated manner four times in the 80 MHz channel. That is, the first part is transmitted in a first 20 MHz subchannel and its duplications are transmitted in second, third and fourth 20 MHz subchannels respectively.

In order to decrease a PAPR of a transmitter STA for transmitting the L-STF, the L-LTF, the L-SIG, and the HEW-SIGA, multiplication may be performed on a phase waveform in unit of 20 MHz channel as follows.

$$R(k) = \begin{cases} -1, k \geq -64 \\ +1, k < -64 \end{cases}$$ [Equation 4]

This means that the first part is phase-rotated by multiplying +1 for the first 20 MHz subchannel and is phase-rotated by multiplying −1 for the second, third and fourth 20 MHz subchannels.

The equation 4 can be expressed as follows. The 256 subcarriers are divided into first and second subgroups that have different number of subcarriers. The first subgroup is phase-rotated by multiplying +1 and the second subgroup is phase-rotated by multiplying −1.

For each 64 FFT-based subchannel constituting 1024 FFT, in order to decrease a PAPR of a transmitter STA for transmitting HEW-STF, HEW-LTF, and HEW-SIGB, multiplication may be performed on a phase waveform in unit of subchannel as follows.

$$R(k) = \begin{cases} -1, 256 \leq k \\ +1, 192 \leq k < 256 \\ -1, 64 \leq k < 192 \\ +1, 0 \leq k64 \\ -1, -192 \leq k < 0 \\ +1, 256 \leq k \leq -192 \\ -1, -448 \leq k < -256 \\ +1, k \leq -448 \end{cases}$$ [Equation 5]

More specifically, according to Equation 5, 1024 subcarriers are divided into 16 subchannels. Respective subchannel is composed of 64 subcarriers. A sequence {+1, −1, −1, −1, +1, −1, −1, −1, +1, −1, −1, −1, +1, −1, −1, −1} may be multiplied for the 16 subchannels, starting from a subchannel having a smallest subcarrier index, that is, a lowermost subchannel.

The equation 5 can be expressed as follows. The 1024 subcarriers are divided into 8 subgroups. The first subgroup is phase-rotated by multiplying +1, the second subgroup is phase-rotated by multiplying −1, the third subgroup is phase-rotated by multiplying +1, the fourth subgroup is phase-rotated by multiplying −1, the fifth subgroup is phase-rotated by multiplying +1, the sixth subgroup is phase-rotated by multiplying −1, the seventh subgroup is phase-rotated by multiplying +1 and the eighth subgroup is phase-rotated by multiplying −1.

A sequence constituting the HEW-STF and the HEW-LTF is as follows.

HEW-STF={HTS$_{-58,58}$,0,0,0,0,0,0,0,0,0,0,0,
HTS$_{-58,58}$,0,0,0,0,0,0,0,0,0,0,0,HTS$_{-58,58}$,0,0,0,0,
0,0,0,0,0,0,0,0,HTS$_{-58,58}$,0,0,0,0,0,0,0,0,0,0,0,
HTS$_{-58,58}$,0,0,0,0,0,0,0,0,0,0,0,HTS$_{-58,58}$,0,0,0,0,
0,0,0,0,0,0,0,0,HTS$_{-58,58}$,0,0,0,0,0,0,0,0,0,0,0,
HTS$_{-58,58}$},

HEW-LTF={LTFleft,1,LTFright,−1,−1,−1,1,1,−1,1,−
1,1,1,−1,LTFleft,1,LTFright,1,−1,1,−1,0,0,0,1,−
1,−1,1,LTFleft,1,LTFright,−1,−1,−1,1,1,−1,1,−1,
1,1,−1,LTFleft,1,LTFright,0,0,0,0,0,0,0,0,0,0,0,
LTFleft,1,LTFright,−1,−1,−1,1,1,−1,1,−1,1,1,−1,
LTFleft,1,LTFright,1,−1,1,−1,0,0,0,1,−1,−1,1,
LTFleft,1,LTFright,−1,−1,−1,1,1,−1,1,−1,1,1,1,−1,
LTFleft,1,LTFright,0,0,0,0,0,0,0,0,0,0,0,LTFleft,
1,LTFright,−1,−1,−1,1,1,−1,1,−1,1,1,1,−1,LTFleft,
1,LTFright,1,−1,1,−1,0,0,0,1,−1,−1,1,1,LTFleft,1,
LTFright,−1,−1,−1,1,1,−1,1,−1,1,1,1,−1,LTFleft,1,
LTFright,0,0,0,0,0,0,0,0,0,0,0,LTFleft,1,
LTFright,−1,−1,−1,1,1,−1,1,−1,1,1,1,−1,LTFleft,1,
LTFright,1,−1,1,−1,0,0,0,1,−1,−1,1,LTFleft,1,
LTFright,−1,−1,−1,1,1,−1,1,−1,1,1,1,−1,LTFleft,1,
LTFright}, Herein, $HTS_{-58,58} =$
$\sqrt{½}\{0,1,1+j,0,0,0,-1-j,0,0,0,1+j,0,0,0,-1-j,0,0,$
$0,-1-j,0,0,0,1+j,0,0,0,0,0,0,-1-j,0,0,0,-1-j,0,$
$0,0,1+j,0,0,0,1+j,0,0,0,1+j,0,0,0,1+j,0,0,0,0,0,0,$
$0,0,0,0,0,0,0,1+j,0,0,0,-1-j,0,0,0,1+j,0,0,0,-1-$
$j,0,0,0,-1-j,0,0,0,1+j,0,0,0,0,0,0,0,-1-j,0,0,0,-$
$1-j,0,0,0,1+j,0,0,0,1+j,0,0,0,1+j,0,0,0,1+j,0,0\},$ LTFleft={1,1,-1,-1,1,1,-1,1,-1,1,1,1,1,1,1,-1,-1,1,
   1,-1,1,-1,1,1,1,1}, LTFright={1,-1,-1,1,1,-1,1,-1,1,-1,-1,-1,-1,1,
   1,-1,-1,1,-1,1,-1,1,1,1,1}

An FFT size can be increased to improve PPDU transmission efficiency. In order to provide compatibility with the legacy STA, the first part (STF, LTF, L-SIG and HEW-SIGA) using the same FFT size as the legacy PPDU is first transmitted, and subsequently the second part (HEW-STF, HEW-LTF, HEW-SIGB and a PSDU) using a larger FFT size are transmitted.

In order to decrease a PAPR of a transmitter STA, the first part and the second part use different phase rotation in frequency domain. It means that a phase rotation for subcarriers in the first part is different from a phase rotation for subcarriers in the second part.

Figure 8:
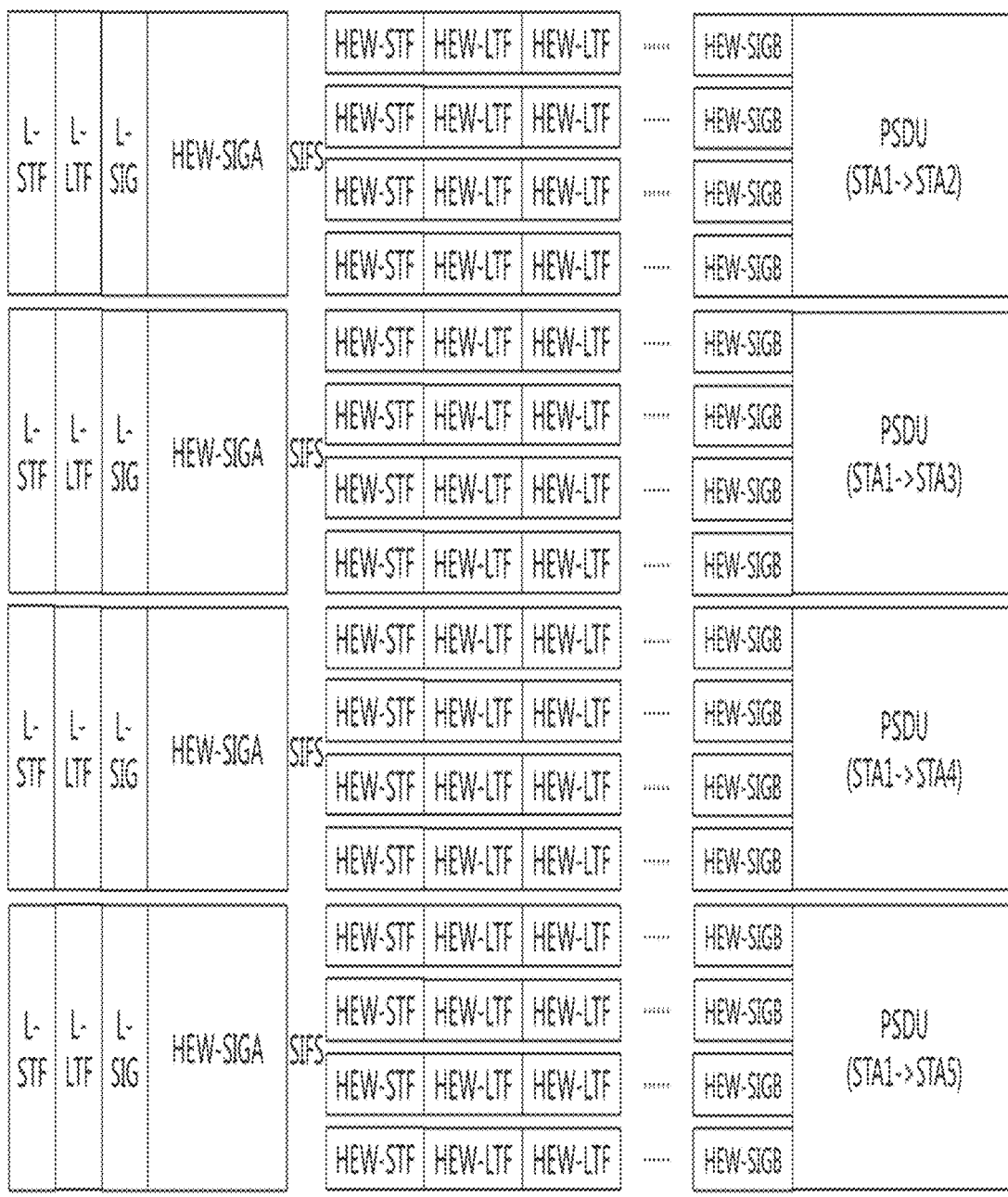
FIG. 8 shows a PPDU format according to another embodiment of the present invention.

FIG. 8 shows a PPDU format according to another embodiment of the present invention.

Since the number of OFDM subcarriers per unit frequency increases after transmitting L-STF, L-LTF, L-SIG, and HEW-SIGA, a processing time may be required to process data with larger FFT size. The processing time may be called an HEW transition gap.

In an embodiment, the HEW transition gap may be implemented by defining a Short Inter-Frame Space (SIFS) followed by the HEW-STF. The SIFS may be positioned between the HEW-SIGA and the HEW-STF. The SIFS may be positioned between the HEW-SIGB and the HEW-STF.

In another embodiment, the HEW transition gap may be implemented in such a manner that the HEW-STF is transmitted one more time. The duration of the HEW-STF may vary depending on the processing time or STA's capability. If the processing time is required, the duration of the HEW-STF may become double.

Figure 9:
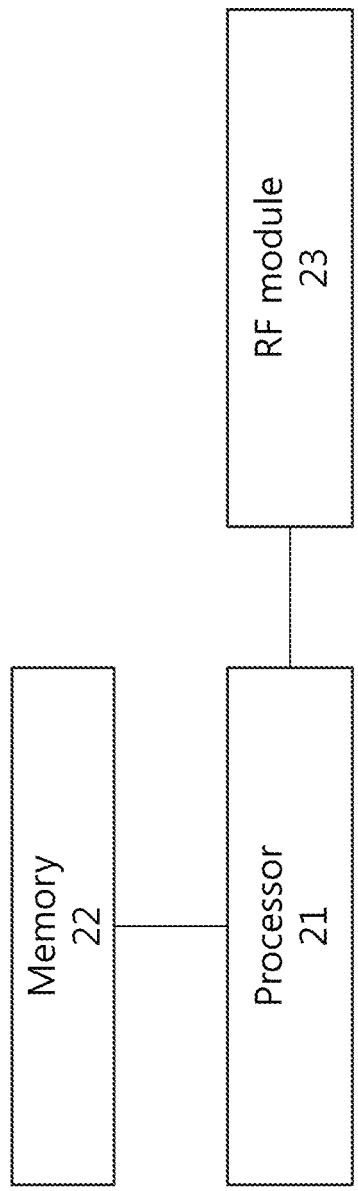
FIG. 9 shows a block diagram of an STA to implement embodiments of the present invention.

FIG. 9 shows a block diagram of an STA to implement embodiments of the present invention.

The STA may include a processor 21, a memory 22, and a Radio Frequency (RF) module 23.

The processor 21 implements an operation of the STA according to the embodiment of the present invention. The processor 21 may generate a PPDU according to an embodiment of the present invention and may instruct the RF module 23 to transmit the PPDU. The memory 22 stores instructions for the operation of the processor 21. The stored instructions may be executed by the processor 21 and may be implemented to perform the aforementioned operation of the STA. The RF module 23 transmits and receives a radio signal.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method of communicating over an operating bandwidth of a wireless local area network, the method comprising:
   receiving a first part of a physical layer protocol data unit (PPDU)
      wherein the first part comprises a legacy-short training field (L-STF), a legacy-long training field (L-LTF), a first signal field, the first signal field having a first phase rotation,
      wherein the first signal field is received over the operating bandwidth that is divided into a plurality of first sub-channels for communication of the first signal field,
      wherein the first phase rotation was realized by multiplying a first multiplication value to at least one sub-channel of the plurality of the first sub-channels, the first multiplication value selected from +1, −1 and +j based on a sub-carrier index value range of a corresponding first sub-channel,
   receiving a second part of the PPDU,
      wherein the second part comprises an STF, an LTF, a second signal field, and a data portion, the second signal field having a second phase rotation,
      wherein the second signal field is received over the operating bandwidth that is divided into a plurality of second sub-channels for communication of the second signal field,
      wherein the second phase rotation was realized by multiplying a second multiplication value to at least one sub-channel of the plurality of the second sub-channels, the second multiplication value selected from +1 and −1, and
      wherein the data portion is received over the operating bandwidth that is divided into a plurality of third sub-channels for communication of the data portion.

2. The method recited in claim 1 further comprising:
   determining whether the second part of the PPDU has an orthogonal frequency division multiple access (OFDMA) allocation by examining an indication of the first signal field before receiving the second part of the PPDU.

3. The method recited in claim 1 wherein each of the plurality of first sub-channels for transmission of the first part has a bandwidth of 20 MHz and each of the plurality of second sub-channels for transmission of the second signal field of the second part has a bandwidth less than 20 MHz.

4. The method recited in claim 1
   wherein the L-LTF of the first part has a first fast Fourier transform (FFT) size and the LTF of the second part has a second FFT size; and wherein the second FFT size is four times greater than the first FFT size.

5. The method recited in claim 4
wherein the first FFT size is 64 and the second FFT size is 256 when the operating bandwidth is 20 MHz;
wherein the first FFT size is 128 and the second FFT size is 512 when the operating bandwidth is 40 MHz;
wherein the first FFT size is 256 and the second FFT size is 1024 when the operating bandwidth is 80 MHz; and
wherein the first FFT size is 512 and the second FFT size is 2048 when the operating bandwidth is 160 MHz.

6. The method recited in claim 1, wherein symbol duration for the L-LTF is fixed.

7. The method recited in claim 1, wherein guard interval for the L-LTF is fixed.

8. A device configured for communicating over an operating bandwidth in a wireless local area network, the device comprising:
a radio frequency module configured to transmit and receive radio signals; and
a processor operatively coupled with the radio frequency module;
memory disposed to said processor, said memory including instructions, when executed by said processor causing the device to:
receive a first part of a physical layer protocol data unit (PPDU)
wherein the first part comprises a legacy-short training field (L-STF), a legacy-long training field (L-LTF), a first signal field, the first signal field having a first phase rotation,
wherein the first signal field is received over the operating bandwidth that is divided into a plurality of first sub-channels for communication of the first signal field, and
wherein the first phase rotation was realized by multiplying a first multiplication value to at least one sub-channel of the plurality of the first sub-channels, the first multiplication value selected from +1, −1 and +j based on a sub-carrier index value range of a corresponding first sub-channel; and
receive a second part of the PPDU
wherein the second part comprises an STF, an LTF, a second signal field, and a data portion, the second signal field having a second phase rotation,
wherein the second signal field is received over the operating bandwidth that is divided into a plurality of second sub-channels for communication of the second signal field, and
wherein the second phase rotation was realized by multiplying a second multiplication value to at least one sub-channel of the plurality of the second sub-channels, the second multiplication value selected from +1 and −1, and
wherein the data portion is received over the operating bandwidth that is divided into a plurality of third sub-channels for communication of the data portion.

9. The device recited in claim 8 wherein said memory further comprising instruction for the processor to determine whether the second part of the PPDU has an orthogonal frequency division multiple access (OFDMA) allocation by examining an indication of the first signal field before receiving the second part of the PPDU.

10. The device recited in claim 8 wherein each of the plurality of first sub-channels for transmission of the first part has a bandwidth of 20 MHz and each of the plurality of second sub-channels for transmission of the second signal field of the second part has a bandwidth less than 20 MHz.

11. The device recited in claim 8
wherein the L-LTF of the first part has a first fast Fourier transform (FFT) size and the LTF of the second part has a second FFT size; and
wherein the second FFT size is four times greater than the first FFT size.

12. The device recited in claim 11
wherein the first FFT size is 64 and the second FFT size is 256 when the operating bandwidth is 20 MHz;
wherein the first FFT size is 128 and the second FFT size is 512 when the operating bandwidth is 40 MHz;
wherein the first FFT size is 256 and the second FFT size is 1024 when the operating bandwidth is 80 MHz; and
wherein the first FFT size is 512 and the second FFT size is 2048 when the operating bandwidth is 160 MHz.

13. The device recited in claim 8, wherein symbol duration for the L-LTF is fixed.

14. The device recited in claim 8, wherein guard interval for the L-LTF is fixed.

* * * * *